United States Patent [19]
Petrick et al.

[11] Patent Number: 5,920,070
[45] Date of Patent: Jul. 6, 1999

[54] SOLID STATE AREA X-RAY DETECTOR WITH ADJUSTABLE BIAS

[75] Inventors: Scott W. Petrick, Sussex; Larry R. Skrenes, Hartland; Paul R. Granfors, Milwaukee, all of Wis.; George E. Possin, Schenectady, N.Y.

[73] Assignee: General Electric Company, New York, N.Y.

[21] Appl. No.: 08/758,604

[22] Filed: Nov. 27, 1996

[51] Int. Cl.⁶ .................................................. G01T 1/24
[52] U.S. Cl. ................................. 250/370.09; 378/98.8
[58] Field of Search .................. 250/370.06, 370.09, 250/370.11; 378/98.8, 98.9, 116

[56] References Cited

U.S. PATENT DOCUMENTS

| | | | |
|---|---|---|---|
| 4,797,560 | 1/1989 | Berger et al. | 250/370.09 |
| 4,996,413 | 2/1991 | McDaniel et al. | 250/208.1 |
| 5,041,888 | 8/1991 | Possin et al. | 357/23.7 |
| 5,352,884 | 10/1994 | Petrick et al. | 250/208.1 |
| 5,530,238 | 6/1996 | Meulenbrugge et al. | 378/98.8 |

*Primary Examiner*—Edward J. Glick
*Attorney, Agent, or Firm*—Quarles & Brady

[57] ABSTRACT

A large area solid state x-ray detector employs a number of photodiodes that are charged electrically then discharged by exposure to x-ray. Ghost images resulting from release of charge trapped in photodiodes during prior exposures are eliminated by adjusting the biasing during a reset portion of the imaging cycle. Biasing may be increased to decrease the recharge time or reversed in polarity to evenly discharge the diodes or decreased to preserve the offset so that it may be removed from subsequent images by image processing.

9 Claims, 3 Drawing Sheets

SOLID STATE AREA X-RAY DETECTOR WITH ADJUSTABLE BIAS

FIELD OF THE INVENTION

The invention relates to x-ray detectors and in particular, solid-state x-ray detectors that can detect x-rays over an area.

BACKGROUND OF THE INVENTION

The first x-ray images were made by exposing photographic film to an area beam of x-ray radiation after it had passed through a patient. Photographic film is still the medium of choice for many radiographic procedures, particularly where high image resolution is required. The photographic film may be coupled with a phosphor screen, which enhances the film sensitivity to x-ray radiation by converting the x-ray radiation into visible light.

Often it will be necessary for a doctor to view an x-ray image in real-time while performing a surgical procedure such as a cardiac catheterization. In these circumstances, the x-ray film is replaced with an image intensifier and a television camera. The x-ray striking a phosphor screen at the front of the image intensifier, produces a faint light image which is intensified by the image intensifier and read by the television camera. The use of the image intensifier permits a lower dosage of x-rays commensurate with the need to continuously expose the patient with radiation while a real-time image is acquired.

In certain circumstances, it is desirable to convert an x-ray image into a digital representation for processing by a computer. The digital representation of the image (digital image) may be processed, for example, to enhance edges in the image or correct for distortion of the image intensifier. Certain techniques such as digital subtraction angiography require that two images of a patient, one taken with and one taken without a contrast agent injected into the patient, be subtracted from each other. This subtraction may be done easily with digitized images.

Digital images may be obtained by scanning conventional photographic film or by using a photostimulable phosphor plate which is exposed like film then taken to a reader to be scanned and digitized. Alternatively, the electrical signal output by the television camera on an image intensifier/television camera system, may be converted directly to a digital signal through the use of a high speed analog to digital converter.

With improvements in the fabrication techniques for constructing large area integrated circuit arrays (such as are used in LCD-type computer displays) there has been considerable interest in constructing a large area solid state x-ray detector, that provides a digital signal directly to processing equipment. One such detector design described in U.S. Pat. No. 4,996,413 issued Feb. 26, 1991 to the same assignee as that of the present invention and hereby incorporated by reference, employs an array of cells each comprised of a photodiode and thin film transistor arranged in columns and rows beneath a phosphor. An intrinsic capacitance associated with each diode is first charged and then the array is exposed to x-rays. X-rays striking the phosphor produce light photons, which then strike the photodiodes, causing charge to be lost from their intrinsic capacitances. After a period of exposure, charge is restored to the photodiodes. The amount of charge restored to each photodiode indicates the x-ray dose received by each photodiode. An electrical signal indicating the restored charge is digitized and stored as a digital image.

In order to provide suitable spatial resolution, a large number of photodiodes are employed. The wiring necessary to connect each photodiode to the necessary charging and measuring circuitry, is reduced by connecting the photodiodes to individually addressable columns and rows. Specifically, each photodiode is connected through a solid state switch to a column conductor common with all the other photodiodes in a given column. The photodiodes may therefore share wiring by being read-out one at a time through time division multiplexing. Specifically, a single column conductor provides a charging current to all photodiodes in a given column and is connected to a separate measuring circuit for that column, which can quantify the amount of charging current provided to the photodiodes of that column. Control terminals of the solid state switches which when asserted, allow current to flow to the photodiodes of one row, are connected to row conductors common for all the diodes of a given row. Thus, after exposure of the photodiodes, the photodiode array may be scanned by selectively asserting one row conductor to charge all the photodiodes in a given row. Because only one photodiode of that row is connected to each column conductor, the amount of current flowing through the column conductor when a given row conductor is asserted is related to the recharging of a single photodiode. This process is repeated with each row conductor successively asserted until each of the photodiodes is recharged and the amount of restoring charge required is measured.

Attached to each column conductor (so as to measure the charge passing into the column conductor) is an integrator, which integrates the current flowing into the column conductor over the time that each row is asserted to produce a total charge measure. At the end of integration, prior to the charge measurement, the integrator must be allowed to "settle" for a short period of time to remove the effect of noise spikes, caused by the switching of the solid state switches coupled to the column conductors by the crossing row and column conductors. After the charge measurement, the integrator must be reset prior to the next row being measured.

As a result of the non-single crystalline structure of amorphous silicon, a large density of defect states exists within the photodiode. These defect states trap electrons and holes and release them with a time constant determined mainly by the energy level of the defect state, in some cases much longer than a fluoroscopic frame time. For simplicity, we will refer only to trapped electrons throughout this document, but it should be understood that holes can be trapped in a like manner and the same mechanisms apply to holes. Therefore, whenever the electric field within the photodiode is perturbed either by electrons generated by light from an x-ray exposure or by the bias voltage being varied, trapped electrons within the photodiode are redistributed among these defect states, generating a detrapping current with a long time constant at the photodiode terminals.

Under certain circumstances, such as when a low dose fluoroscopic image sequence immediately follows a high dose radiographic image, the number of the detrapping electrons is significant compared to the fluoroscopic image signal levels. Since the release of these trapped electrons takes typically much longer than a fluoroscopic frame time, and the image of the detrapping electrons will appear in the form of the high dose radiograph image, the subsequent fluoroscopic images will appear corrupted with a slowly decaying ghost image of the previous radiograph. This phenomena is typically referred to as photodiode lag.

BRIEF SUMMARY OF THE INVENTION

The present invention decreases the ghost image associated with photodiode lag by adjusting the bias across the photodiodes while they are being recharged and/or measuring, storing and subtracting the ghost image from subsequent low x-ray flux fluoroscopic images. Four different methods may be used. In one method, the bias across the photodiodes is increased during a reset period to increase the recharging rate of the photodiode, then decreased again for imaging purposes. In a second method, the bias is reversed entirely to forward bias the diode and thus to completely discharge its capacitance so that all diodes charge from the same point. In a third method, the bias on the photodiode is changed according to the radiographic technique used. When a low dose fluoroscopic procedure follows a high dose radiographic procedure the bias is reduced, minimizing the rate of release of trapped electrons and reducing the rate of decay of the ghost image, as measured and stored, which is simply digitally subtracted from later fluoroscopic images. In a fourth method, the bias on the photodiode is either kept constant or adjusted according to any of the previous three methods. When a low dose fluoroscopic procedure immediately follows a high dose radiographic procedure, ghost offset images are periodically measured, stored and subtracted from later fluoroscopic images.

Specifically, the invention provides an area x-ray detector having a plurality of electrically chargeable photodiodes arranged over the area. A bias control circuit provides a bias voltage across the photodiodes to charge them and an integrator is configured to provide a reading of total charge delivered to each photodiode during the charging. Acquisition control electronic circuitry, programmed to acquire an image, reads the total charge delivered to each photodiode and then resets the charge integrators. The acquisition control circuitry can then change the bias voltage to a second bias voltage different from the first bias voltage prior to any further exposures in one of three manners.

The first two modes are similar in that the change in bias voltage is only temporary; the difference being that one change would forward bias the photodiodes and the other would apply a higher electric field to the photodiode. By forward biasing all photodiodes within the array, all defect states within the photodiode are filled with electrons, in effect erasing the ghost image, in favor of a spatially more uniform and predictable decaying offset image. Applying a more negative bias would accelerate the release of trapped electrons within the photodiode. In both cases, the acquisition control circuitry reads out the detector a number of times in order for all the photodiodes to become equally charged in the absence of exposure. Then the acquisition control circuitry can restore the first bias voltage, again reading out the detector a number of times to allow the photodiodes to settle to the first bias voltage. Once the detector has been read sufficiently for the photodiode to settle to the first bias voltage, the next exposure is made and the detector is read out in a normal manner under the control of the acquisition control circuitry.

In the third mode, when the acquisition control circuitry changes the bias voltage to a second bias voltage different from the first bias voltage, the change is not as temporary, meaning images are actually acquired using this second bias voltage after the detector has been read a sufficient number of times for the photodiode to settle to this second bias voltage. Furthermore, the second bias voltage is less negative than the first and prior to the next exposure, the acquisition control circuitry will obtain an image to be used as the offset image for the exposures to follow.

In all cases, the intention is to reduce or eliminate the effect of a ghost image produced by the lag associated with a high level exposure in a lower level exposure which follows. The change in bias occurs between the high level exposure and the low level exposure. In the third mode, the change back to the first bias voltage occurs between the lower level exposure and the high level exposure.

In a fourth method, the photodiode bias is held constant or adjusted according to the previous three methods. Ghost offset images are periodically measured, stored and subtracted from exposed images, reducing or eliminating the ghost image in the final subtracted image sequence.

It is one object of the invention to employ a variable bias voltage on the photodiodes in order to optimize the acquisition of images while reducing to the extent possible any ghost images from previous scans of the photodiodes. By temporarily increasing the bias during the time between a high dose radiograph and low dose fluoroscopic exposures, the photodiodes are forced to release trapped electrons more rapidly, reducing the radiographic ghost image in the subsequent fluoroscopic sequence. Alternately, a temporary forward biasing of the diodes between procedures may be performed to fill all defect traps with electrons, effectively eliminating any ghost image. Additionally, the rate of detrapping electrons may be reduced to the point of eliminating the ghost image by reducing the photodiode bias. Finally, the photodiode bias can be kept constant or adjusted according to any of the previous three methods and offset images periodically measured, stored and subtracted from subsequent images during the digital processing of those images to completely eliminate the slowly decaying ghost image in the final image presentation.

The area detector may include an exposure technique input line receiving a signal indicating the anticipated fluence of x-rays to be received by the detector. In acquiring an image, the acquisition control electronic circuitry may be programmed to charge the photodiodes to a first bias voltage dependent on the signal from the exposure technique input line. After the exposure, the image is read from the detector when the total charge delivered to each photodiode is measured and restored and then the charge integrators are reset. If the next exposure is expected to be of different dose, the exposure technique input line would reflect this expectation and the photodiode would be programmed to a second bias voltage prior to the next exposure. After this exposure, the image is read exactly as before and the charge on the photodiode is restored to that of the second bias.

Thus, it is another object of the invention to flexibly adjust the bias across the photodiodes to optimize their response with respect to different dosages of x-ray radiation. Generally, in higher dose procedures, dark currents may be ignored and a higher bias may be used to provide a greater dynamic range in the imaging process, i.e. the greater voltage allows more charge to be depleted from the photodiode during an exposure. In lower dose procedures, dark currents are more significant and a lower bias voltage may be used.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made, therefore, to the claims herein for interpreting the scope of the invention.

BRIEF DESCRIPTION OF THE SEVERAL VIEW OF THE DRAWINGS

DETAILED DESCRIPTION OF THE INVENTION

Figure 1:
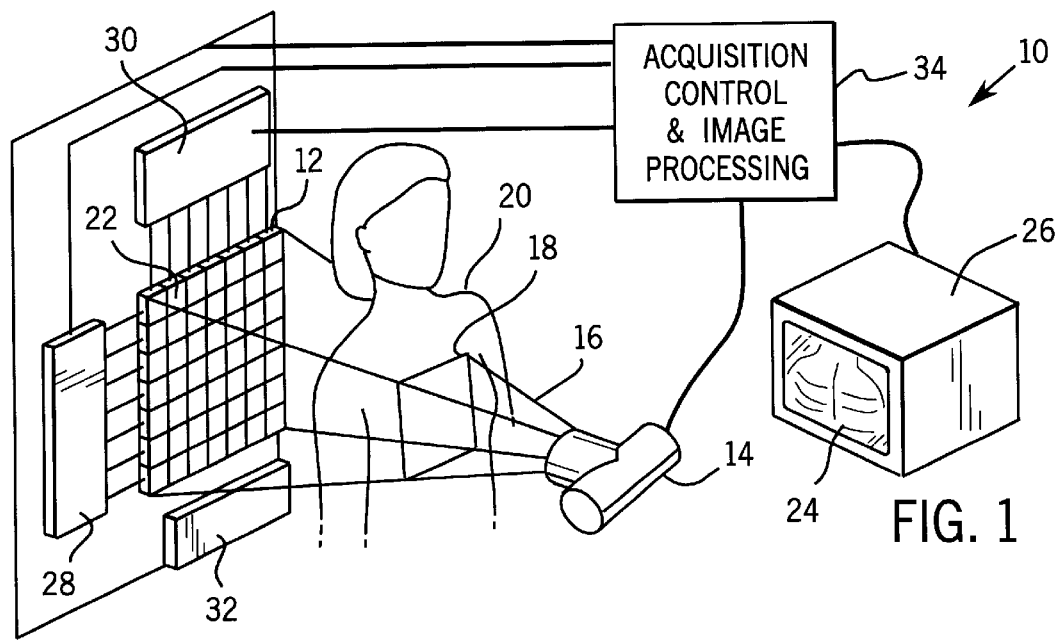
FIG. 1 is a perspective view showing the area detector of the present invention as composed of rows and columns of detector cells in position to receive x-rays passing through a patient during a radiographic procedure.

Referring now to FIG. 1, an x-ray system 10 incorporating the area array 12 of the present invention provides an x-ray tube 14 collimated to provide an area x-ray beam 16 passing through an area 18 of a patient 20. The beam 16 is attenuated along its many rays by the internal structure of the patient 20 to then be received by the detector array 12 which extends generally over an area in a plane perpendicular to the central ray of the x-ray beam 16.

The array 12 is divided into a plurality of individual cells 22 arranged rectilinearly in columns and rows. As will be understood to those of ordinary skill in the art, the orientation of the columns and rows is arbitrary, however, for clarity of description it will be assumed that the rows extend horizontally and the columns extend vertically.

As will be described in more detail below, during operation, the rows of cells 22 are scanned one at a time by scanning circuit 28 so that exposure data from each cell 22 may be read by read-out circuit 30. Each cell 22 independently measures the intensity of radiation received at its surface and thus the exposure data read-out provides one pixel of information in an image 24 to be displayed on a monitor 26 normally viewed by the user.

A bias circuit 32 controls a bias voltage to the cells 22 as will be explained further below.

Each of the bias circuit 32, scanning circuit 28, and read-out circuit 30, communicates with an acquisition control and image processing circuit 34 which coordinates the operation of the circuits 30, 28 and 32 by means of an electronic processor (not shown). The acquisition control and image processing circuit 34, also controls the x-ray tube 14, turning it on and off and controlling the tube current and thus the fluence of x-rays in beam 16 and/or the tube voltage and hence the energy of the x-rays in beam 16.

The acquisition control and image processing circuit 34 also provides image data to the monitor 26, based on the exposure data provided by each cell 22.

Figure 2:
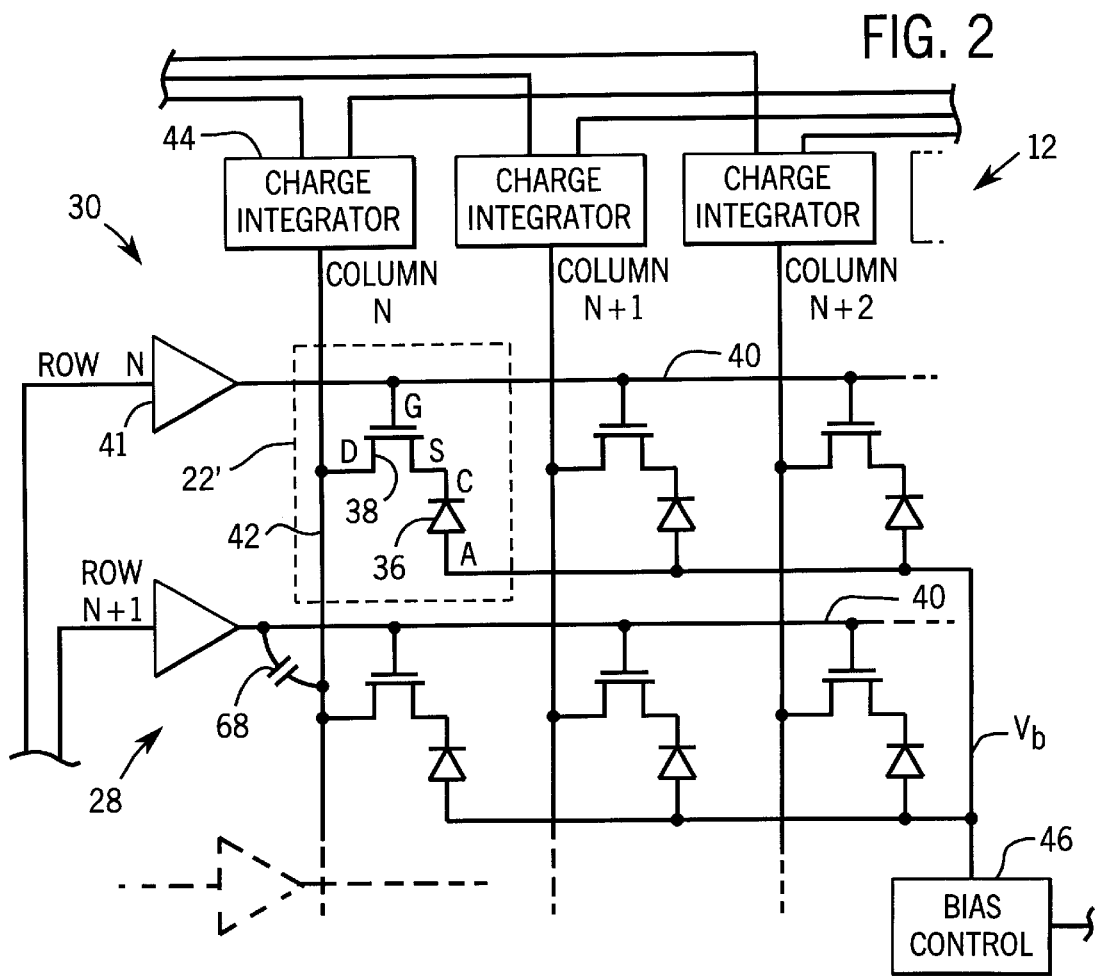
FIG. 2 is a fragmentary schematic of the detector of FIG. 1, showing six detector cells each composed of a solid state switch and photodiode, the cells connected together in rows and columns with columns attached to charge integrators.

Referring now to FIG. 2 a given cell 22' of the array 12 includes a photodiode 36 having its cathode connected to the source of an FET 38. It will be understood to those of ordinary skill in the art that for many FET devices, the drain and source are interchangeable and hence the designation of either is solely in reference to the convention of the figures. The photodiode 36 may be fabricated of amorphous silicon so that the area of the photodiode 36 may extend substantially over the entire area of the cell 22'. The FET 38 may be a thin film transistor, also fabricated of amorphous silicon.

The drain of the FET 38 connects to a column conductor 42 which joins the drains of all FETs in cells in the same column as cell 22'. The column conductor 42 is connected to a charge integrator 44 which will be described in detail below, but which provides an essentially constant reference voltage ($V_o$) to the cathode of the photodiode 36 when the FET 38 is on.

The anode of the photodiode 36 is connected to a bias control 46, which during normal operation imposes a negative voltage on the anode of the photodiode 36. Thus, when the FET 38 is conducting, the junction capacitance associated with the photodiode 36 will charge. Substantially, no DC current flows, however, because the photodiode 36 is reversed biased.

The bias control 46 is under the control of the acquisition control and image processing circuit 34 which can change the bias voltage $V_b$ at any time.

The gate of the FET 38 is connected to a row conductor 40 which joins that gate to the gates of other FET's of other cells in the same row as cell 22'. The voltage at the gate of the FET 38 controls current flow between the drain and source of the FET 38 and thus the row conductor 40 serves to allow one signal to control the current flow through the FET of each cell in a row.

Each row conductor 40 connects to a driver 41 which is capable of maintaining the row conductor 40 in a high state at a voltage generally above the threshold voltage of the FET 38 or in a low state at a voltage generally below the lesser voltage upon the drain and source of the FET 38. Thus, when row conductor 40 is maintained in the high state, current can flow through the FET 38 and when maintained in the low state, no current flows through the FET 38.

Each cell 22 of the array 12 has a similar structure and is connected in the identical fashion described with respect to cell 22', with separate column conductors 42 and charge integrators 44 for each column of cells 22 and separate row conductors 40 and drivers 41 for each row of cells 22.

Figure 3:
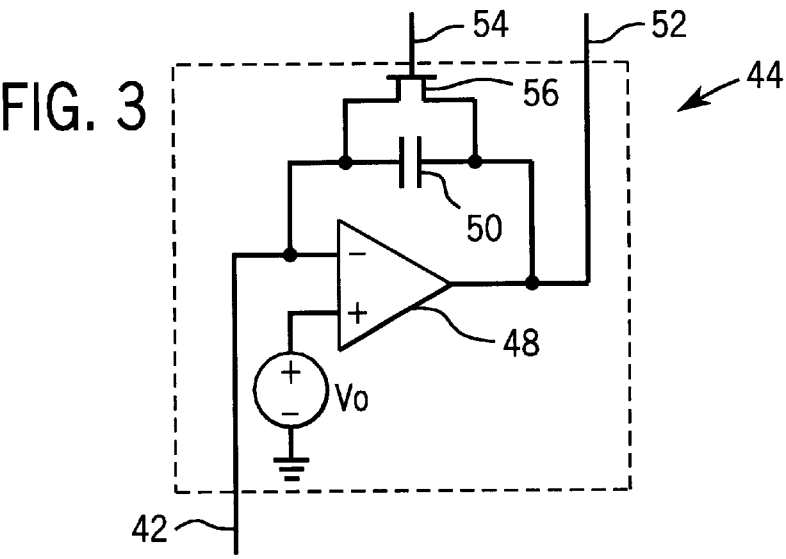
FIG. 3 is a schematic of the charge integrators of FIG. 2, showing its sensing, output and reset lines, the sensing lines attached to a column of detectors.

Referring now to FIGS. 2 and 3, the charge integrators 44 receive column conductors 42 at an inverting input of an operational amplifier 48 whose positive input is connected to the desired reference voltage $V_o$ for the column conductors 42. The operational amplifier 48 is selected to have extremely high input impedance, low offset and low drift. The output of the operational amplifier 48 is connected through a reference capacitor 50 of known value to the inverting input of the operational amplifier 48. Current flowing from the operational amplifier 48 to the column conductors 42 will charge capacitor 50. The voltage on capacitor 50 is therefore reflected as the output voltage 52 of the operational amplifier which represents the total charge conducted onto the column conductor 42 since the last time the integrator 44 was reset.

Resetting of the integrator 44 is accomplished by a reset signal on line 54 which turns on an FET 56 shunting capacitor 50 thus discharging capacitor 50 and returning the output 52 of the operational amplifier 48 to the reference voltage.

Figure 4:
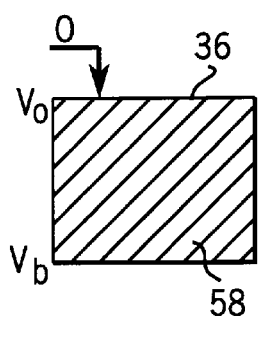
FIGS. 4 through 6 are graphic representations of the charging and discharging of the photodiode capacitance of an individual cell during an image acquisition, in which charge restored after x-ray exposure is a measure of the dose.

Referring now to FIG. 4, while operating the array 12, during periods without exposure, the photodiode will stabilize at a fully restored potential, Vo–Vb, and hold this potential until the next scan, one frame period later, in the absence of leakage. After completion of the initial charging of the photodiode 36 as shown in FIG. 4, the voltage across the photodiode 36 will be near its maximum value of Vo–Vb determined by the difference between the bias voltage (Vb) and the reference voltage (Vo) of the integrator 44.

Figure 5:
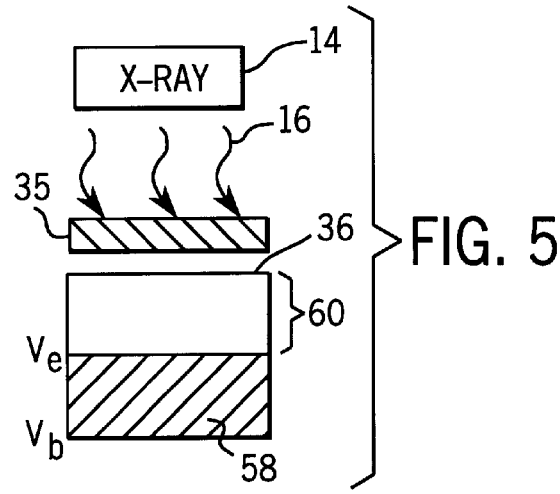

As shown in FIG. 5, with the row conductor 40 de-asserted, the radiation of a scintillator 35 positioned above the photodiode 36 by an x-ray beam 16 produces light photons which deplete the charge 58 on the photodiode 36 so that the voltage across the photodiode 36 drops to some level $V_e-V_b$.

Figure 6:
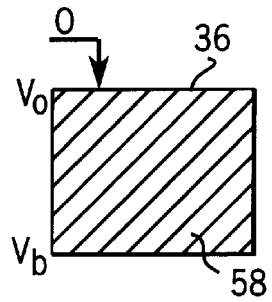

As shown in FIG. 6, the charge is restored on the photodiode 36 via the column conductor 42 by asserting the row conductor 40 associated with that photodiode 36 until the voltage rises to the initial voltage level, $V_o-V_b$. The measured amount of x-ray exposure thus will be proportional to the difference between $V_o$ and $V_e$ indicated by distance 60 in FIG. 5.

Figure 7:
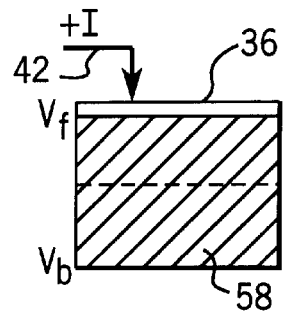
FIG. 7 shows the depletion of photodiode charge due to the release of electrons from defect states within the amorphous silicon.
Figure 11:
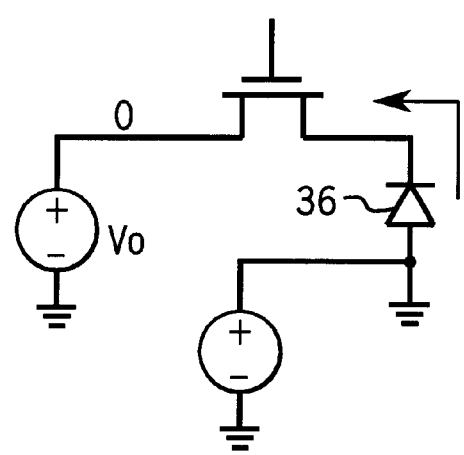
FIG. 11 is a detailed view of a cell of FIG. 2 showing a forward biasing of the photodiode such as may be used to eliminate ghost imaging.

After the readout of the high dose radiographic exposure 71 of FIG. 11, the detector is repeatedly read out at regular intervals. FIG. 7 shows the diode potential, which has dropped to $V_f-V_b$, just prior to the start of one of these readouts. This apparent loss of stored charge on the photodiode is due to the release of electrons that were generated during the exposure and trapped in defect states within the amorphous silicon photodiode. The rate of release and number of trapped electrons from these defect states within the amorphous silicon photodiode is a function of the integrated charge generated during exposure, the time that has transpired from this exposure, the bias voltage on the photodiode and the density and energy level of trap states within the photodiode.

On subsequent readouts of the photodiode, an error signal proportional to the difference between $V_o$ and $V_f$ will be measured. If exposures follow, this error signal will add to the exposure signals. Because the error signal caused by the difference between $V_o$ and $V_f$ is a function of the integrated charge generated during exposure, the error is reflected as a ghost image overlying subsequent images.

Figure 8:
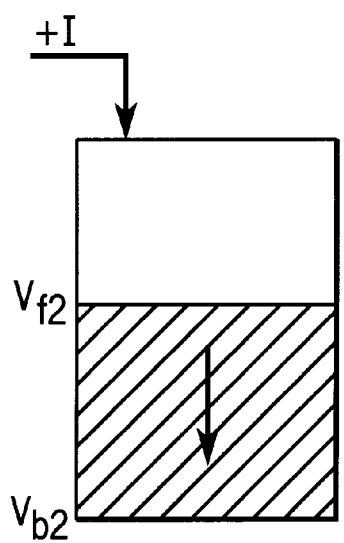
FIG. 8 is a representation of the photodiode of FIG. 7, under increased bias voltage and after receiving additional charge.
Figure 9:
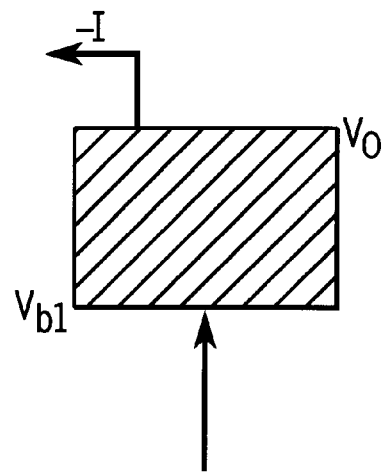
FIG. 9 is a representation of the photodiode of FIG. 8, after restoration of the bias levels to those corresponding to FIG. 7 and showing elimination of the undercharging of the photodiode.
Figure 10:
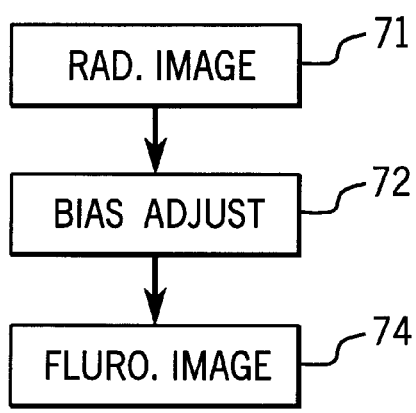
FIG. 10 is a flow chart showing two x-ray procedures separated by the bias adjustment of FIGS. 7, 8 and 9.

Increasing the bias voltage across the photodiode 36 by decreasing $V_b$ to $V_{b2}$ shown in FIG. 8, provides a higher field strength within the photodiode, increasing the rate of release of trapped electrons and consequently reducing the time needed to re-establish charge equilibrium within the photodiode. As shown in FIG. 9, after some predetermined time period, the bias potential is returned to its original state, $V_b$, in preparation for the next sequence of exposures. Referring now to FIG. 10, the bias adjustment of FIGS. 7 through 9 may occur after a radiographic procedure 71 in which the photodiodes 36 are subject to significant charge depletion as a result of higher x-ray dosages. The bias adjustment of FIGS. 7, 8 and 9 represented by process block 72 may then be performed to force trapped electrons generated during the radiographic exposure, 71, to be released prior to a low dose fluoroscopy procedure 74 which may follow.

Referring now to FIG. 11, in an alternative bias adjustment $V_b$ is made positive with respect to voltage $V_0$ forward biasing photodiode 36 so that it conducts, uniformly filling the deep (in energy) defect traps of all the photodiodes with electrons. The spatial distribution of trapped electrons will be independent of the state which was produced by a previous high level exposure, and therefore independent of the image obtained from this high level exposure. This will produce an additional excess signal in following read frames, which will be more uniform in nature than would the ghost image. The effect will be primarily an offset of the entire image (which could be removed from the image sequence by a time dependent offset added to the data) and not a distracting ghost image.

After the high dose radiograph 71 of FIG. 10 is obtained, the rate of release of trapped electrons (i.e. the detrapping current) from amorphous silicon defect states can be quite large. In a third embodiment of the invention, if the potential across the photodiode is reduced, the rate of release of trapped electrons can be reduced to a level where little or no ghost image of the previous radiograph 71 appears in the subsequent fluoroscopic sequence 74. The small detrapping current that does remain at the lower photodiode bias voltage can be sampled, stored and subtracted from subsequent images to remove the ghost image which this detrapping current produces.

In a fourth embodiment of this invention, the bias voltage $V_b$ is either held constant or changed according to any of the previously discussed methods, after the high dose radiographic image 71 in FIG. 10 is obtained and before the low dose fluoroscopic image sequence 74 in FIG. 10 begins. Subsequently, the charge shortfall produced by the release of trapped electrons may be periodically measured, stored and subtracted by the acquisition control and image processing circuit 34. To maintain acceptable subtraction of the slowly decaying ghost of the high dose radiographic image 71 in FIG. 10 from a subsequent sequence of fluoroscopic images 74 in FIG. 10, it is necessary to periodically "drop" an exposure frame from the fluoroscopic image sequence to measure and track the state of ghost image as it decays.

The ability to change the bias on the photodiodes 36 during the image processing also allows the present invention to optimally select between bias levels depending on the procedure. For high dose procedures such as normal radiographic studies, bias voltage may be increased to increase the amount of charge that the photodiodes 36 may hold and thus the amount of dose they may receive before becoming completely discharged and thus effectively saturating. This increase in bias improves the dynamic range of the detector.

In contrast, during a low dose fluoroscopic procedure, it is desirable to reduce the bias on the photodiodes 36 because high dynamic range is not required insofar as insufficient dose is received during each exposure interval to fully deplete even a diode with a low bias. The low biasing decreases the charge loss due to dark current thus decreasing offset added to the image during the scanning process. Thus bias may be simply set based on an exposure technique selected by the user and communicated through the acquisition control and image processing circuit 34 to the x-ray tube 14 and to the bias circuit 32.

In order to apprise the public of the various embodiments that may fall within the scope of the invention, the following claims are made.

We claim:

1. An area x-ray detector comprising:
   (1) a plurality of electrically chargeable photodiodes arranged over the area;
   (2) a bias control circuit providing a bias voltage across the photodiodes to charge a photodiode capacitance of each photodiode;
   (3) at least one charge integrator configured to provide a reading of the total charge delivered to each photodiode;
   (4) acquisition control electronic circuitry programmed to:
      (a) acquire an image signal by:
         (i) charging the photodiodes to a first bias voltage;
         (ii) measuring the total charge delivered to each photodiode after exposure to x-rays by means of the at least one charge integrator; and
         (iii) resetting the at least one charge integrator;
      (b) reset the photodiodes by charging the photodiodes to a second bias voltage different from the first bias voltage.

2. The x-ray detector of claim 1 wherein the second bias voltage is positive and wherein the acquisition control circuit is further programmed to apply the second bias voltage temporarily between exposures.

3. The x-ray detector of claim 1 wherein the second bias voltage is more negative than the first bias voltage and wherein the acquisition control electronic circuitry is further programmed to apply the second bias voltage temporarily between exposures.

4. The x-ray detector of claim 1 wherein the second bias voltage is less than the first bias voltage.

5. The x-ray detector of claim 1 including:
   an exposure technique input line receiving a signal indicating the anticipated fluence of x-rays to be received by the detector; and
   wherein the acquisition control electronic circuitry
      (b) resets the photodiodes by charging the photodiodes to the second bias voltage and measures the total charge delivered to each photodiode during the resetting at the second bias voltage by means of the at least one charge integrator to produce an offset image; and including
      (c) image processing circuitry and software providing an output image based on a subsequent image signal minus the offset signal.

6. The x-ray detector of claim 1 including an exposure technique input line receiving a signal indicating the anticipated fluence of x-rays to be received by the detector; and
   wherein the acquisition control electronic circuitry resets the photodiodes with a second bias voltage across the photodiode greater than the first bias voltage only when the exposure technique input line indicates the anticipated fluence of x-rays will be higher than a previous fluence of x-rays.

7. The x-ray detector of claim 1 including an exposure technique input line receiving a signal indicating the anticipated fluence of x-rays to be received by the detector;
   wherein the acquisition control electronic circuitry resets the photodiodes with a second bias voltage less than the first bias voltage only when the exposure technique input line indicates the anticipated fluence of x-rays will be lower than a previous fluence of x-rays.

8. The detector of claim 1 wherein the photo diodes are constructed of amorphous silicant.

9. An area x-ray detector comprising:
   (1) a plurality of electrically chargeable photodiodes arranged over the area;
   (2) a bias control circuit providing a bias voltage across the photodiodes to charge the capacitance of each photodiode;
   (3) at least one charge integrator attached to the photodiodes to provide a reading of total charge delivered to each photodiode;
   (4) an exposure technique input line receiving a signal indicating the anticipated fluence of x-rays to be received by the detector;
   (5) acquisition control electronic circuitry programmed to acquire an image signal by:
      (i) charging the photodiodes to a bias voltage dependent on the signal from the exposure technique input line;
      (ii) measuring the total charge delivered to each photodiode by means of the charge integrator at least one; and
      (iii) resetting the at least one charge integrator.

* * * * *